(12) United States Patent
Carroll

(10) Patent No.: US 12,494,734 B2
(45) Date of Patent: Dec. 9, 2025

(54) DIY VERTICAL SOLAR TOWER SYSTEMS AND METHODS

(71) Applicant: David W. Carroll, Grantsburg, WI (US)

(72) Inventor: David W. Carroll, Grantsburg, WI (US)

(*) Notice: Subject to any disclaimer, the term of this patent is extended or adjusted under 35 U.S.C. 154(b) by 3 days.

(21) Appl. No.: 18/534,365

(22) Filed: Dec. 8, 2023

(65) Prior Publication Data

US 2024/0195346 A1 Jun. 13, 2024

Related U.S. Application Data

(60) Provisional application No. 63/431,242, filed on Dec. 8, 2022.

(51) Int. Cl.
*H02S 20/10* (2014.01)
*H02S 40/38* (2014.01)
*H02S 10/12* (2014.01)

(52) U.S. Cl.
CPC .............. *H02S 20/10* (2014.12); *H02S 40/38* (2014.12); *H02S 10/12* (2014.12)

(58) Field of Classification Search
CPC .......... H02S 20/10; H02S 40/38; H02S 10/12; H02S 20/30; H02S 30/20; H10K 85/50; H10K 39/601
See application file for complete search history.

(56) References Cited

U.S. PATENT DOCUMENTS

| | | | |
|---|---|---|---|
| 7,718,923 B1 | 5/2010 | Hansen et al. | |
| 9,653,632 B1 | 5/2017 | Beitman, Sr. | |
| 10,119,292 B1 | 11/2018 | Harvey et al. | |
| 2003/0038610 A1 | 2/2003 | Munshi et al. | |
| 2003/0038910 A1 | 2/2003 | Nagano et al. | |
| 2006/0225781 A1 | 10/2006 | Locher | |
| 2007/0074755 A1* | 4/2007 | Eberspacher | H10F 77/939 |
| | | | 136/244 |
| 2007/0151594 A1 | 7/2007 | Mascolo et al. | |

(Continued)

FOREIGN PATENT DOCUMENTS

| | | |
|---|---|---|
| CN | 204539058 U | 8/2015 |
| JP | 2002353488 A | 12/2002 |

(Continued)

*Primary Examiner* — Michael Y Sun
(74) *Attorney, Agent, or Firm* — DICKE, BILLIG & CZAJA, PLLC

(57) ABSTRACT

Systems and methods for capturing and storing solar energy. The system includes a solar collection device, at least one battery, and at least one tower forming component. The solar collection device includes a flexible substrate and a perovskite-based photovoltaic layer formed on the substrate. The battery is electrically connected to the perovskite-based photovoltaic layer. The solar collection device is transitionable between a flat state, a storage state in which the solar collection device is rolled onto itself, and a tower state in which solar collection device is maintained vertically upright and defines at least one curve between the opposing sides by the at least one tower forming component. In some embodiments, the at least one battery is mounted to the substrate and defines a segmented central region that facilitates arrangement of the solar collection device to a tower state having a D-like shape.

20 Claims, 13 Drawing Sheets

(56) References Cited

U.S. PATENT DOCUMENTS

| | | |
|---|---|---|
| 2008/0190476 A1 | 8/2008 | Baruh |
| 2009/0266397 A1* | 10/2009 | Gibson .................. H02S 40/38 |
| | | 320/101 |
| 2010/0065104 A1 | 3/2010 | Baruh |
| 2010/0154860 A1 | 6/2010 | Fereday |
| 2012/0067339 A1* | 3/2012 | Hall ...................... A01G 9/243 |
| | | 126/714 |
| 2013/0228209 A1 | 9/2013 | Messing |
| 2014/0297072 A1 | 10/2014 | Freeman |
| 2015/0021310 A1 | 1/2015 | Van Straten |
| 2016/0197575 A1 | 7/2016 | Armstrong et al. |
| 2017/0321426 A1 | 11/2017 | Greer |
| 2018/0183384 A1 | 6/2018 | Nagai et al. |
| 2019/0273464 A1 | 9/2019 | Carroll |
| 2021/0011496 A1* | 1/2021 | Lee ...................... G01S 3/7861 |
| 2021/0239284 A1* | 8/2021 | Jeong ...................... F21S 9/032 |
| 2021/0351737 A1* | 11/2021 | Cook ...................... H02S 10/12 |
| 2022/0285640 A1* | 9/2022 | Kawano ............... H10K 30/151 |

FOREIGN PATENT DOCUMENTS

| | | |
|---|---|---|
| KR | 10-2013-0093453 A | 8/2013 |
| WO | 2011147542 A2 | 12/2011 |

\* cited by examiner

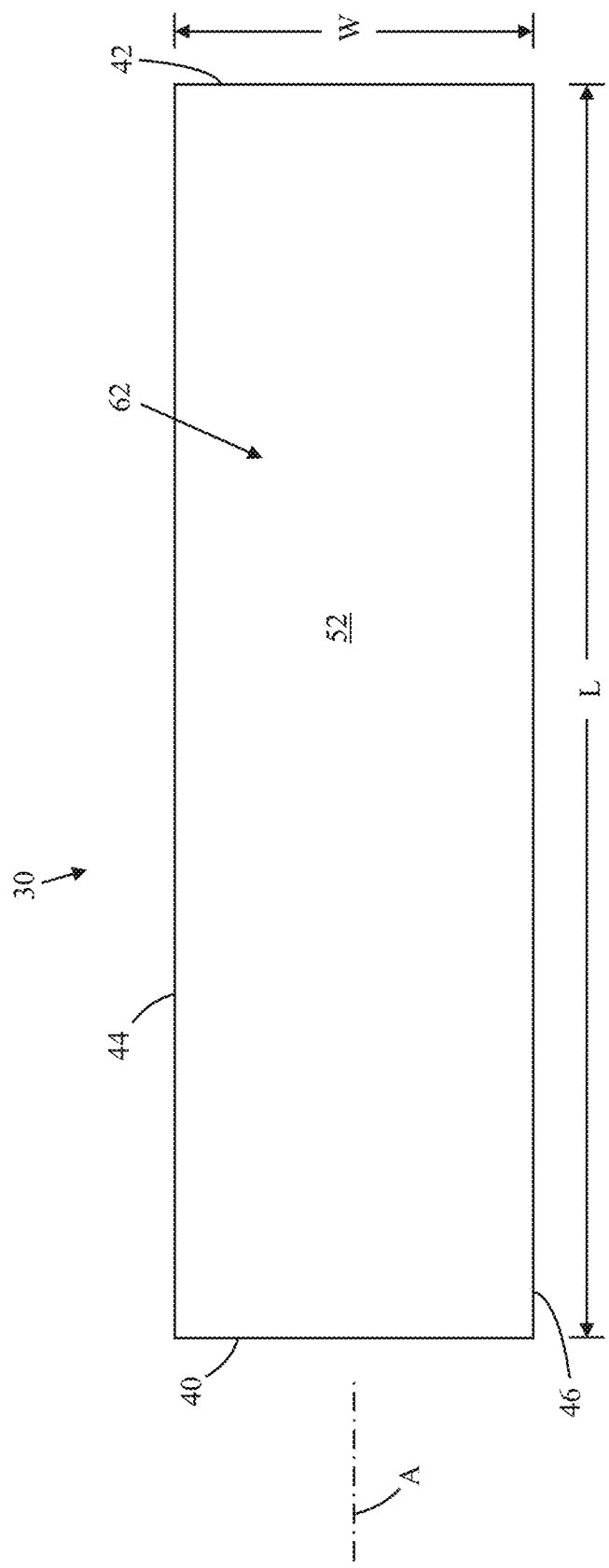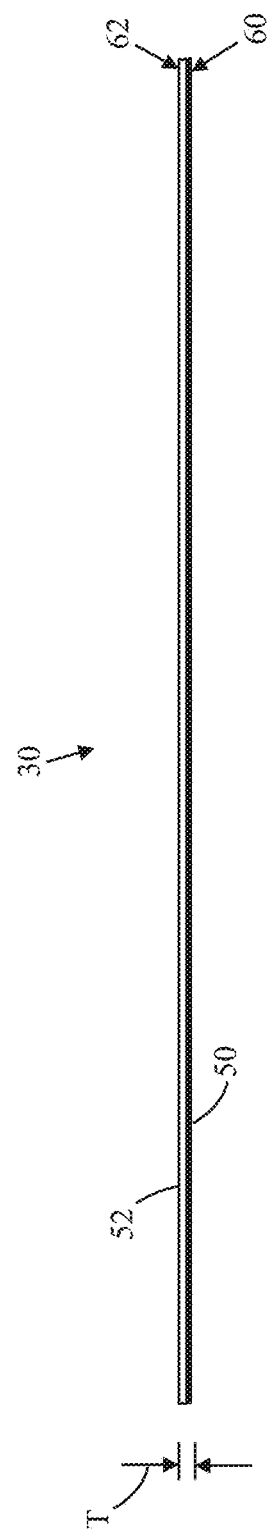
FIG. 2A
FIG. 2B

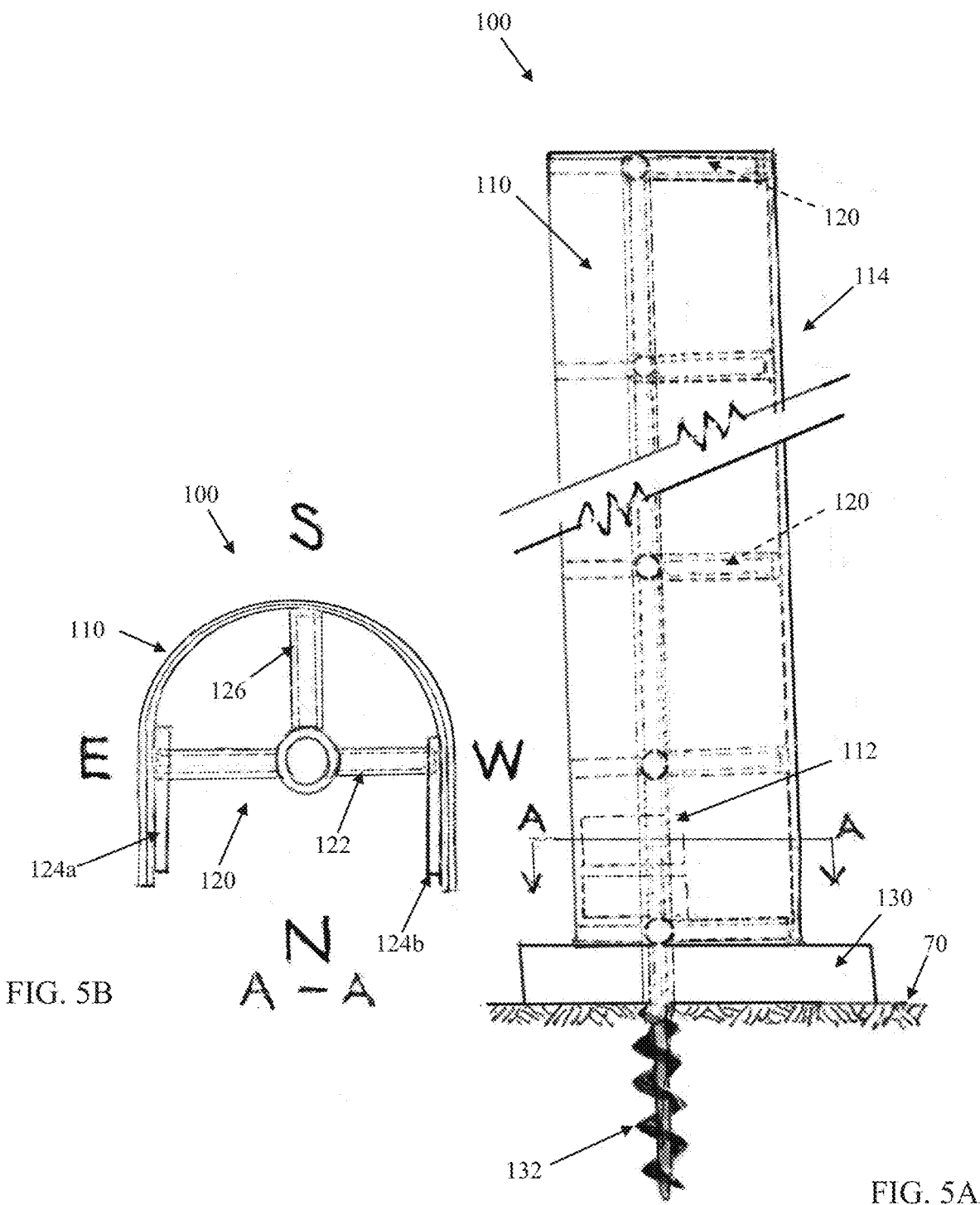

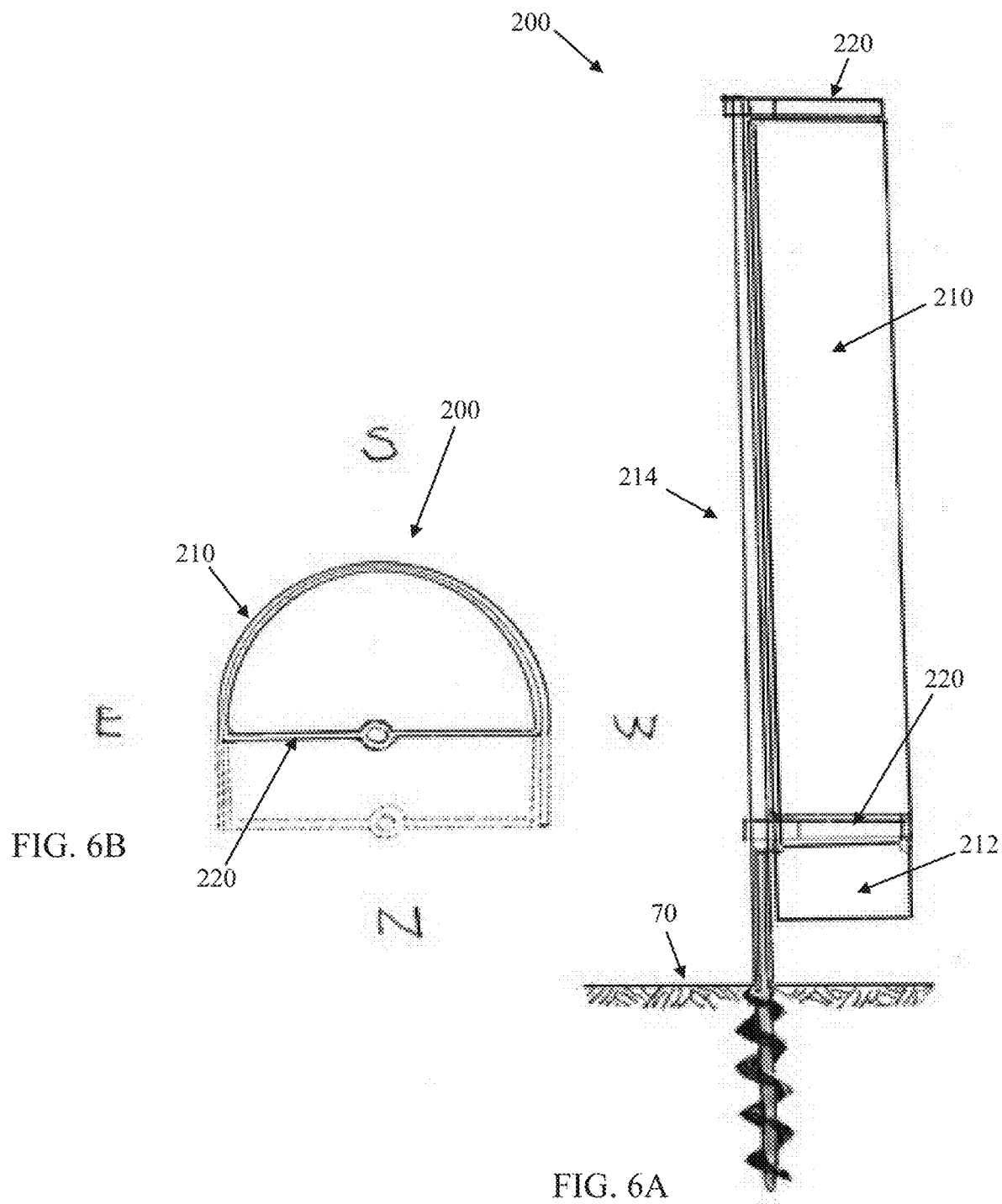

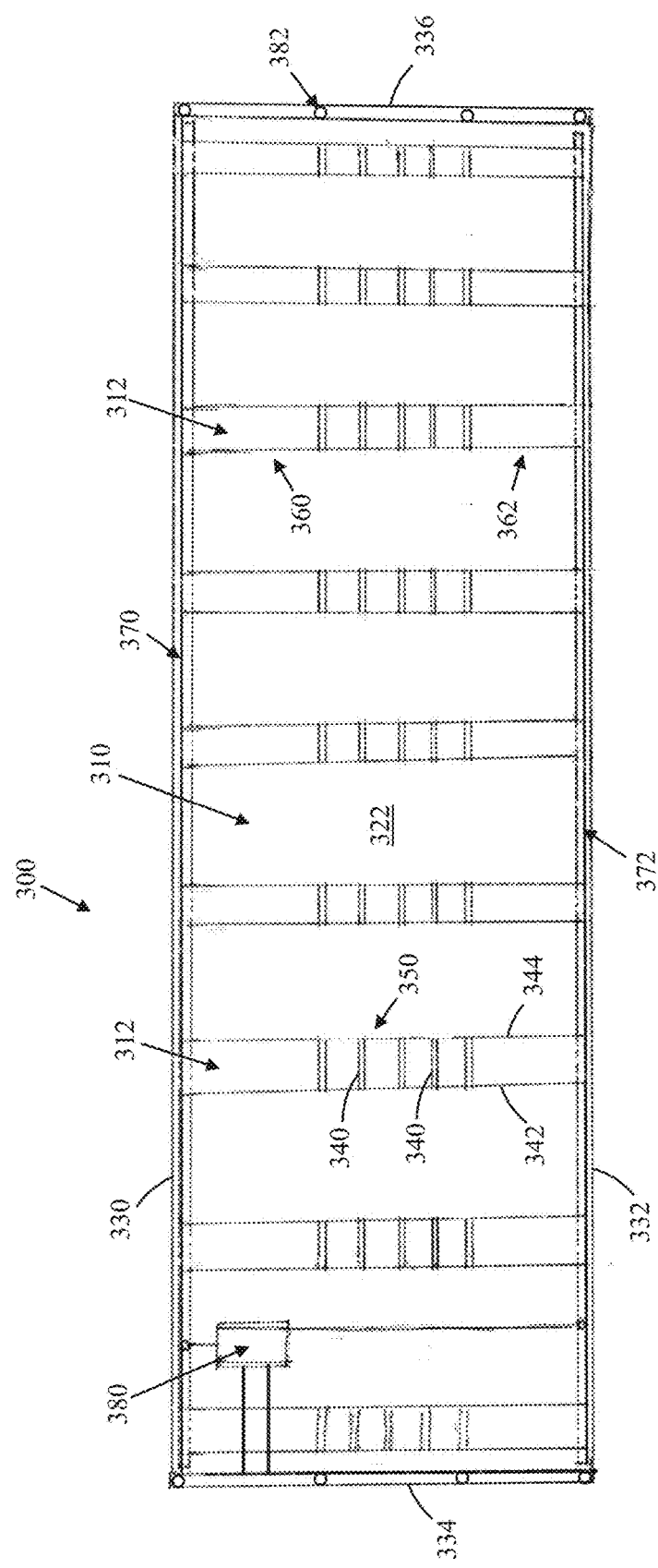
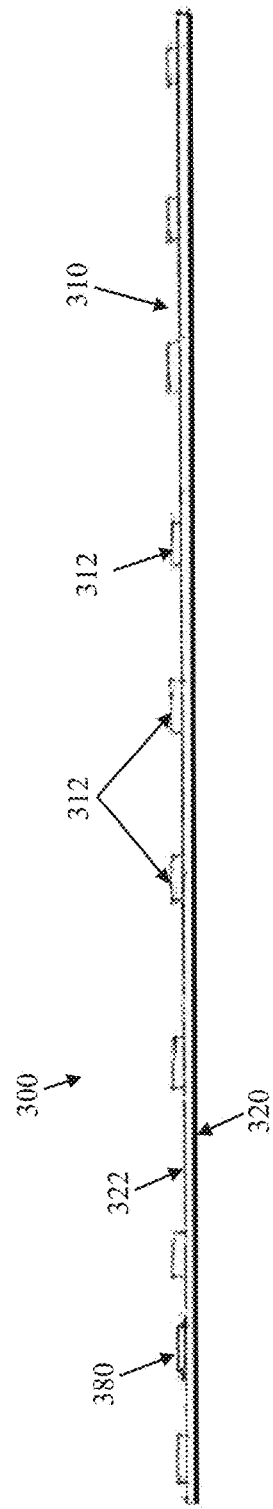
FIG. 7A
FIG. 7B

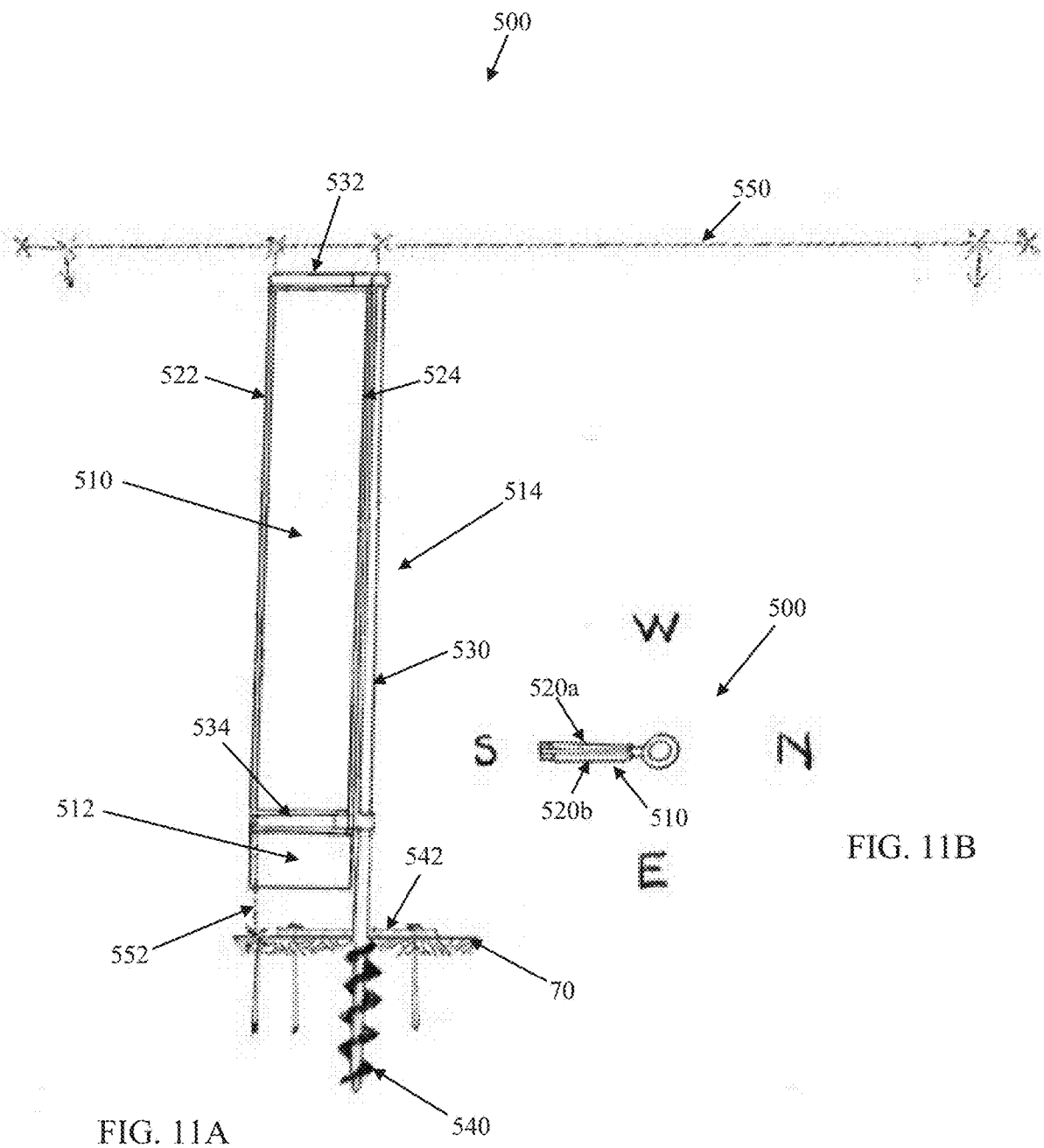

DIY VERTICAL SOLAR TOWER SYSTEMS AND METHODS

CROSS-REFERENCE TO RELATED APPLICATIONS

This Non-Provisional Patent Application claims the benefit of the filing date of U.S. Provisional Patent Application No. 63/431,242, filed Dec. 8, 2022, the entire teachings of which are incorporated herein by reference.

BACKGROUND

The present disclosure is directed to devices for collecting solar energy. More particularly, it relates to inexpensive and easy to install solar energy collection devices and systems.

Climate change is a human caused threat to planet life. Human emissions of greenhouse gas (GHG) mostly $CO_2$ and methane are excessive to nature's GHG normal exchanges, and this forms a reflective GHG particulate blanket in the atmosphere. This 'blanket' retains excessive solar energy in the Earth's environment in the form of heat while also raining down excessive $CO_2$ into the ocean. This raises ocean temperature, acidity and sea level. Some terrestrial areas will get so hot and humid (Wet Bulb Temperature) that much of human, animal and plant life will be unsustainable. This added energy is thawing permafrost which emits methane captured for millennia. This greatly adds to the GHG imbalance. Thawing of the Arctic, Greenland, Antarctica and glaciers further raises the ocean and floods low-lying heavily occupied lands. In short order the lack of a reflective summer surface ice also means darker waters which adds to ocean warming. Warmer ocean water swells from retained energy too. This elevation change is devastating to low islands and coastal low-level cities. This is further influenced by high-tides and storms such that eventually many cities will be permanently lost. The GHG imbalance has already raised ocean acidity 50% which makes it increasingly difficult for shelled creatures to form protective enclosures. According to published studies, increasing amounts of melting ice into fresh water in the Atlantic Ocean due to climate change has a 95% chance of stopping the Atlantic Meridional Overturning Circulation (AMOC) as soon as two years but at least by 2095. This loss of the critical conveyor of temperature moderation will plunge the Northern Hemisphere into a deep cold period. The levels of ocean oxygen are dropping at 4× the rate previously thought. Generally speaking, human emissions have taken us outside nature's narrow and critical window for thriving life. Current renewable systems are growing quickly but are still not sufficient to meet the climate change challenge.

One especially helpful way to address this challenge is to use more renewable and/or non-polluting energy sources vs. burning fossil fuels. This is especially important as developing countries are greatly increasing energy demands.

Solar power has already proven to be cost/per/watt advantageous vs. all other energy sources. Future solar gain and pricing improvements are likely to double or triple that advantage. Another solar benefit is that it can be provided near to use. This reduces transmission and voltage change losses and provides national security value if only solar systems were easier to install more locally.

As the cost of solar hardware continues to plummet from increased efficiency and high-volume production, the soft costs, mostly installation, continues to rise as a percentage of the cost. Residential application installation costs are now on the order of 60-70% of the total system price. Reasons for this not dropping include solar install labor and skills shortage. Also, panel weight and size of hardware panels (especially when roof mounted), mounting hardware costs (roof or ground) and margins for system suppliers. Further, locations for positioning distributed solar gathering systems is difficult as they take large X-Y areas and often limits installation to the roof. This can be quite difficult to access and mount. Most homeowners or "do-it-yourself" (DIY) individuals are simply unwilling to undertake these efforts. Roof mounted systems also invade the roofing and require removal when the roofing requires replacement.

Cloudy days and the dark of night require solar power storage. These storage devices are also demanding of installation expertise.

Currently-available solar power systems are simply not viable for small scale/single user installation. Current systems are too difficult to ship, handle and install for most DIY individuals. Moreover, glass-based solar power collection systems are not conducive to mass production in a manner that can better meet the climate change challenge.

SUMMARY

The inventor of the present disclosure has recognized a need to address one or more of the above-mentioned problems.

Some aspects of the present disclosure relate to systems and methods for collecting and storing solar energy. The systems of the present disclosure can include a solar collection device that incorporates one or more perovskite-based layers as a photovoltaic film. This format is designed for an easy, system ready solar gain with storage DIY device. It can integrate both the perovskite-based film made on a reel-to-reel smart film line with power storage such as the solid-state formats developed by NASA or Sakuu' Corp. The system can be directly connected to auxiliary wiring at the installation site or in some configurations the battery can be removed for the power in an EV, home or other applications.

The tower format of the present disclosure is tall and narrow and is not normally sloped to the latitude as it uses the Leipzig University of Applied Science conclusions that an East/West facing design can be effective. Also, the design can be tall and narrow as compared to other solar systems to also fit current widths for automated reel-to-reel manufacturing lines. In some embodiments, the tower has a D or D-like shape having a curved central region and opposing, flat side regions. The so-formatted tower can be installed such that the curved region faces south and the side regions face east/west. With this arrangement, the south, east and west regions collect sunlight throughout the day, providing a stationary or non-moving approach that effectively "tracks" the sun's movement by shape alone.

In some examples, the systems and methods of the present disclosure can meet a design for DIY user's preference that a solar energy collective power system should have a directly adjoining but removable power storage and other preferences by providing a directly integrated battery. In some examples, the systems of the present disclosure can integrate components that provide intuitive, smart control for best and easiest to install and use features.

In some examples, the systems and methods of the present disclosure use this new, low-cost conductive layer to help with this integration and simplicity. The material can have an integrated flexible roll-up for shipping capacity that also integrates the controls, connections for or complete integration of the solid-state and a flexible but very strong edging feature that may be used for mounting and as the structural frame. It can also optionally be used for power conduction and mounting from flat to tower states. The film-as-circuit may contain discrete and other electronic components to manage and report the solar system status. Optionally, the control circuit can be mounted to the flex circuit. Optionally, the flex circuit can include LED lighting.

In some embodiments, the systems and methods of the present disclosure include a solar collection device as a tall, narrow, vertical panel with a curved single one-sided build between the East and West facing segments. This permits manufacturing PV on one side and to gather light for more of the day and more during the mid-day. It also creates a form that is stronger.

In some embodiments, the tall, narrow, vertical format also permits more use of the surrounding ground for crops or to fit on smaller properties. This form of a solar collector in a home yard can still leave considerable space to be used for many normal purposes. Other benefits are it can fit into and adjoining areas of parking lots, business landscapes and along roadways. This optional format can leave a narrower shadow so they can be spaced in more locations and in more patterns. The narrowness also creates a smaller viewing obstruction from nearby windows. It provides less likelihood or shorter timeframe of the shadow falling on another solar tower when spaced and located correctly.

In some embodiments, the systems and methods of the present disclosure include a flexible solar collection device that can be provided to an end-user in a compact, reduced-sized footprint format (e.g., a rolled up solar strip). Upon final installation, the solar collection device is maintained in a shape conducive to collecting sunlight throughout the day, for example a curved shape. In the shipping format of a rolled up solar strip the structural strength may attain the format of a 'D' or 'C' using a shaped support frame. Optionally, these supports cross behind the solar surface and integrate a round or curved segment to attach to the one or more poles. The solar photovoltaic may be formed with a flexible substrate. The photovoltaic may be the type announced by the Princeton University in June of 2022 or typical. The scientists found in testing that a new nano-layer used as a mid-layer in a sandwich using perovskite as the collective photovoltaic surface now last over 30 years while still retaining 80% of original efficiency at a typical latitude of Princeton, New Jersey. This method can be made at 70° F. and can be made on a flexible material such as a low-cost plastic. This flexible photovoltaic format works well to follow the curve and ship in a roll or in a preformed shape.

One option is for the solar tower to include power storage. This can be in a layer on the inside of the device or inside horizontally in the 'D' or 'C' shaped forming brackets. It may be placed only on the lowest bracket or at the bottom and optionally be removable or power use elsewhere. Optionally, the solar tower of this shape can use a flex circuit as the mounting surface or spray surface for the PV and other solar system layers. Optionally, the flex circuit can be polyester or polyimide or another form of circuitry formed on the plastic one being typical to that developed and patented by Automated Assembly Corporation of Lakeville, MN. Optionally, a flex circuit on the solar tower flex layer or integrated within the flex layer may contain components for use with the solar operation, control, power management, owner or user management, wireless control or management or other features like load or battery balancing between towers. This is helpful to string collective towers to run a single line to the house or EV charging location. Optionally, the flex circuit or flex mounting solar surface may include a strong enough cross section of stronger than the flex material to create a more protective resistance to wind damage. For example, a braided wire can be embedded along the edges of the solar flex sheet. Optionally, this strengthening material strip can be conductive. Optionally, this conductive material can be used to bring the power of the solar system to the battery. Optionally, these conductive strips can be dedicated as + or − on either edge. Optionally, this edging material can be structural for holding the system at the base and/or at the top and/or along the middle or as the solar panel frame, or as a part of a cable only support system. In some examples, the braided edge with power transit included may have features for support connection that are insulated from the power transit either through or around the braided form.

The solar collection systems of the present disclosure can include various support assembly constructions appropriate for mounting to an intended installation site. Optionally, the solar system format of the present disclosure can be self-supporting with a base plate or inground pipe(s) or piling(s). Optionally, the solar system format of the present disclosure can be mounted to a house, a tree, a power pole (typical), or above and below other structures. Optionally, two or more of the solar towers of the present disclosure can perform as a cooperative power system by conjoining wires for power and/or for structural support. Optionally, two or more of these solar towers can be placed in row with an offset north and south sufficient for best solar gain from the East and West. Optionally, the solar towers of the present disclosure may have decorative features to make them more appealing to a homeowner and community.

Optionally, the curved solar tower embodiments of the present disclosure can be spaced between segments to improve aesthetics, permit wind passage or to gain light access in certain locations. Optionally, the curved solar towers can have readily removable power storage, batteries, for use in a mobile situation as in an electronic vehicle or for use in a fixed situation as in a house or camping, or in the case of the use by the military, can be moved along with operations. Optionally, the curved solar towers can be wired to a fixed power use location such as a home or business. Optionally, the curved solar tower can be made to mechanically flex so the entire surface is facing toward the sun. For example, in the morning the portion of the 'D' shape can be bent to all aim to the east, midday to the south and evening to the west. Optionally, the curved solar tower can be made to manually or automatically rotate or hinge flat or otherwise adjust or move to safety in certain weather conditions. Optionally, the system can be used on a roof flat (non-tower) or as a tower. Optionally, it can be wrapped around an existing pole or tree to support the standing tower shape. Optionally, a screw flighted as an auger can be used to mount the tower shape.

BRIEF DESCRIPTION OF THE DRAWINGS

FIG. 2A is a simplified bottom plan view of a solar collection device useful with the systems of the present disclosure and in a flat state;

FIG. 2B is a side view of the solar collection device of FIG. 2A;

FIG. 5A is a side view of a solar energy collection and storage system in accordance with principles of the present disclosure upon final installation;

FIG. 5B is an enlarged top view of a portion of the system of FIG. 5A;

FIG. 6A is a side view of a solar energy collection and storage system in accordance with principles of the present disclosure upon final installation;

FIG. 6B is an enlarged top view of a portion of the system of FIG. 6A;

FIG. 7A is a simplified bottom plan view of a solar collection and storage assembly useful with the systems of the present disclosure and in flat state;

FIG. 7B is a simplified side view of the assembly of FIG. 7A;

FIG. 11A is a side view of a solar energy collection and storage system in accordance with principles of the present disclosure upon final installation;

FIG. 11B is an enlarged top view of a portion of the system of FIG. 11A;

DETAILED DESCRIPTION

Figure 1:
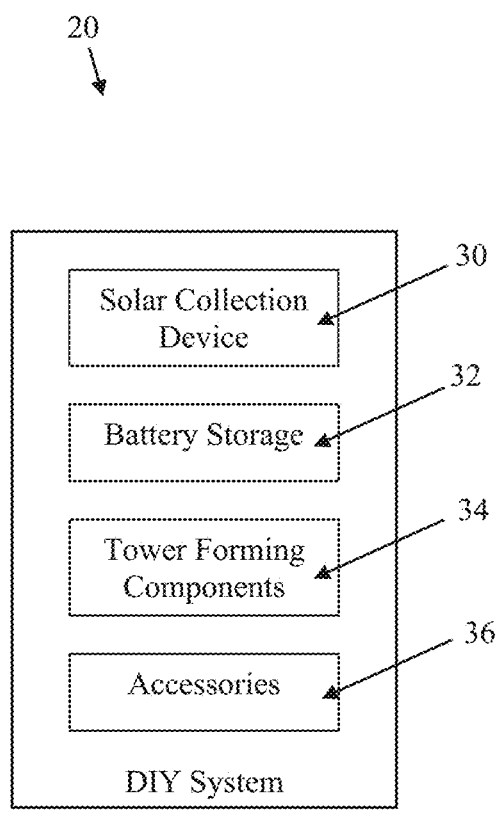
FIG. 1 is a block diagram of a solar energy collection and storage system in accordance with principle of the present disclosure.

Some aspects of the present disclosure are directed to systems, devices and methods for capturing and storing solar energy. With reference to FIG. 1, a DIY solar energy collection and storage system 20 of the present disclosure includes a solar collection device 30, battery storage 32, tower forming components 34, and optional accessories 36. Details on the various components are described below. In general terms, the solar collection device 30 has a flexible, sheet-like construction and is configured to capture solar energy that is conducted to and stored by the battery storage 32. A flexible nature of the solar collection device 30 allows for arrangement in a compact footprint for shipping/delivery to an installation site, as well as arrangement in various upright, tower-like shapes that can be more optimal for exposure to the sun/collecting solar energy. The tower forming components 34 are provided to maintain the solar collection device 30 in the tower arrangement. One or more optional accessories 36 can also be provided with the system 20, for example that assist in controlling operation, auxiliary lighting, etc. The systems and methods of the present disclosure can be highly conducive to simplified installation and operation, well-suited for a DIY user.

The solar collection device 30 of the present disclosure include or incorporate a thin photovoltaic or solar cell device with integrated circuitry components. As a point of reference, photovoltaic solar cells rely on semiconductors to turn the energy from light into electricity. Light from the sun excites the electrons in the semiconductor material, which flows into conducting electrodes and produce electric current. Silicon has been the primary semiconductor material used in solar cells since the 1950's. However, the large silicon crystals used in conventional solar panels require an expensive, complex manufacturing process, and the resultant panels are relatively heavy and cumbersome to transport and install. More recently, perovskite-based photovoltaic devices have been developed. A perovskite is a material that has the same crystal structure as the mineral calcium titanium oxide; perovskite compounds have a chemical formula ABX3, where A and B represent cations, and X is an anion that binds them together. Using this compositional flexibility, perovskite crystals can be designed to create semiconductors with properties similar to silicon. Perovskite solar cells can be manufactured using simple, additive deposition techniques, such as printing, for a fraction of the cost and energy as compared to silicon-based solar cells. In 2012, researchers discovered how to make a stable, thin-film perovskite solar cell with light photon-to-electron efficiencies over 10%. Since then, the sunlight-to-electrical power conversion efficiency of perovskite solar cells has improved exponentially. Perovskite solar cells can also be combined with conventional silicon solar cells, with these tandem solar cells exhibiting greatly improved efficiency (as compared to silicon alone).

In 2022, researchers at Princeton University announced the development of a very long-lasting, film-based perovskite using a new nano-layer discovery. Details of these perovskite-based solar cells are provided Zhao et al., *Accelerated Aging of All-Inorganic, Interface-Stabilized Perovskite Solar Cells*, Science, Vol. 377, Issue 6603, pp. 307-310 (Jun. 16, 2022), the entire teachings of which are incorporated herein by reference. These and similar perovskite-based nano-layer solar films can provide an estimated 30-year life with performance still at 80%. This perovskite solar device can be made at approximately 70° F. when sprayed on a substrate film. In more general terms, perovskite is a very common low-cost material and because it can be applied at room temperature in the form of a spray coating on inexpensive and lightweight film, it is much easier to make, transport and use.

With the above in mind, in some embodiments, the systems and methods of the present disclosure include or incorporate a solar collection device utilizing one or more perovskite-based photovoltaic layers (or solar cells) formed by spraying (or similar manufacturing techniques) onto a substrate. For example, and with reference to FIGS. 2A and 2B, the solar collection device 30 can have a sheet-like format, defining a first end 40 opposite a second end 42, a first side 44 opposite a second side 46, and a front side 50 opposite a back side 52. The solar collection device 30 defines a length L between the opposing ends 40, 42, a width W between the opposing sides 44, 46 and a thickness T between the front and back faces 50, 52. As generally reflected by the views, the length L and the width W are orders of magnitude larger than the thickness T. These and other attributes render the solar collection device 30 to be flexible for reasons made clear below. Further, the length L can be greater than the width W. While the solar collection device 30 need not have the rectangular perimeter shape shown, the solar collection device 30 is generally elongated, defining a longitudinal axis A. The solar collection device 30 includes one or more perovskite layers (or solar cells) 60 formed on or carried by a flexible substrate 62. The phrase "perovskite layers" is inclusive of perovskite solar cells and optional nano layer(s) as described above. The perovskite layer(s) 60 define the front face 50, whereas the flexible substrate 62 defines the back face 52. The perovskite-based solar collection device 30 can further include integrated circuitry components for conducting electrical power converted by the solar cells, for example by providing the substrate 62 as flex circuitry. With these and related embodiments, the perovskite-based solar collection devices 30 of the present disclosure can be flexible (e.g., perovskite formed on a flexible material such as low-cost plastic). The so-provided, flexible perovskite-based solar collection device 30 can be formed and maintained at a desired shape in an end-use installation or application by a frame or the like as described below. Moreover, the flexible solar collection device 30 can be rolled or arranged to a relatively small footprint for convenient shipping/transport. In related embodiments, the solar devices 30 can include, or can be electrically connected to, the power storage device 32 (FIG. 1) (e.g., battery such as a solid-state battery). Some non-limiting examples of flex circuitry and power storage devices useful with the present disclosure are provided in Carroll, US Application Publication No. 2019/0273464, the entire teachings of which are incorporated herein by reference.

In some embodiments, the systems of the present disclosure incorporate the flexible, perovskite-based solar collection device 30 as described above, designed for an easy, system-ready solar gain with storage do-it-yourself (DIY) device. The solar collection device 30 can integrate the perovskite solar cell technologies described by Zhao et al. (as mentioned above) or the like, optionally made on a reel-to-reel smart film line (such as available from Automated Assembly Corporation of Lakeville, MN), and optionally with an integrated solid-state power storage (for example as developed by NASA and the Solid-state Architectures Batteries for Enhanced Rechargeability and Safety (SABERS) team). The solar collection device 30 can be directly connected to user-provided wiring, or in other embodiments the battery provided with the system can be removed for power usage as desired (e.g., electric vehicle (EV), home or other applications). In some embodiments, the systems include framework or the like to support the perovskite-based solar device in a purposed arrangement, resulting, in some embodiments, in a design that is long and narrow compared to other solar collection systems. With these and related embodiments, the long and narrow format can be selected to fit the widths typically employed with automated reel-to-reel manufacturing lines.

Figure 3A:
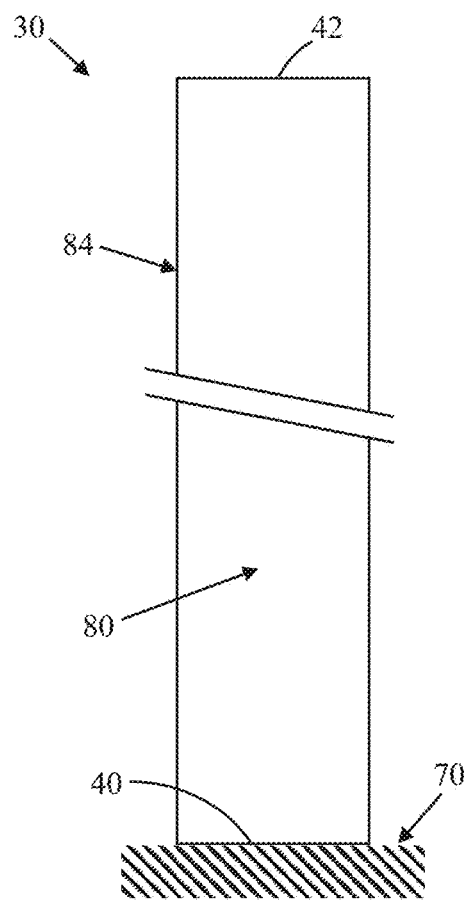
FIG. 3A is a simplified side view of the solar collection device of FIG. 2A in a tower state.

The flexible nature of the solar collection device 30 is conducive to being formed or manipulated into various, different arrangements, for example one arrangement for use in collecting solar energy and another arrangement for storage/shipping. In some instances or end-use applications, the solar collection device 30 can be placed or laid on the ground or other surface in a relatively flat arrangement, akin to a blanket. In other end use applications or installations, the solar collection device 30 can be arranged to a vertical tower state. The tower state can include forming or wrapping the solar collection device 30 to a curved arrangement, for example curving the solar collection device 30 about the longitudinal axis A. One such tower state is reflected by FIGS. 3A and 3B. The solar collection device 30 is substantially vertical relative to ground 70, with the second end 42 being vertically above the first end 40. Further, the solar collection device 30 has been curved to form a "D" or "C"-like shape. For example, as compared to the flat state of FIG. 2A, the opposing sides 44, 46 in the tower state of FIG. 3B have been articulated toward one another, and a curvature is created or formed. In some embodiments, the D-like shape of the solar collection device 30 in the tower state can be described as defining opposing side regions 80, 82 that are substantially flat or planar (i.e., within 10% of being truly flat or planar) and a central curved region 84. This shape is continuous in the solar collection device 30 from the first end 40 to the second end 42. In the tower state of FIGS. 3A and 3B, the front face 50 is the "outside" of the curve and the back face 52 is the "inside". Thus, the perovskite layers (or solar cells) 60 are facing outwardly relative to the tower shape, available to receive sunlight. As described below, the systems of the present disclosure can include tower forming components 34 (FIG. 1) that retain the solar collection device 30 in the tower state (e.g., that support and retain the solar collection device 30 in the D or C shape of FIG. 3B). In other embodiments, the solar collection device 30 can have a shape differing from that of FIG. 3B in the tower state.

In some embodiments, the perovskite-based solar collection device 30 can be readily installed by an individual to extend vertically relative to ground, and is shaped and/or maneuvered over the course of the day to optimize solar collection. In some embodiments, the vertical format of the solar collection devices of the present disclosure in the tower state and operation thereof optionally utilizes data explored in studies in Germany by Leipzig University of Applied Science researchers, examples of which are provided in Reker et al., "Integration of Vertical Solar Power Plants into a Future German Energy System", Smart Energy, Vol. 7, 100083 (August 2022), the entire teachings of which are incorporated herein by reference. Their studies describe solar panels mounted with photovoltaic (PV) back-to-back vertically (not angled for latitude) and positioned facing East and West in a fixed line going from North to South. Their results shows this performs better than solar panels mounted at a typical slope set for the latitude of placement. Usually, panels are mounted mostly horizontally and oriented to the south for maximum sun exposure as the effective sun appears to travel across the sky. This means at the Earth's equator the panels are lying flat, and at the latitude of most of the US the angles range between 20 and 35 degrees. Tracking systems move panels to follow the sun during the day, but cost and maintenance become an ROI and installation simplicity issue. These researchers have determined that mounting bifacial solar panels facing East and West produce more renewable electricity while reducing one of the side effects of traditionally placed solar energy (example on farms) where electricity during the midday is greater than demand and too little for the morning or afternoon demand. They state that an important advantage is that the rows can be spaced ideally for crops farm machinery to operate between the panels and gathers more energy by facing the earliest and latest daylight in this vertical format.

Figure 3B:
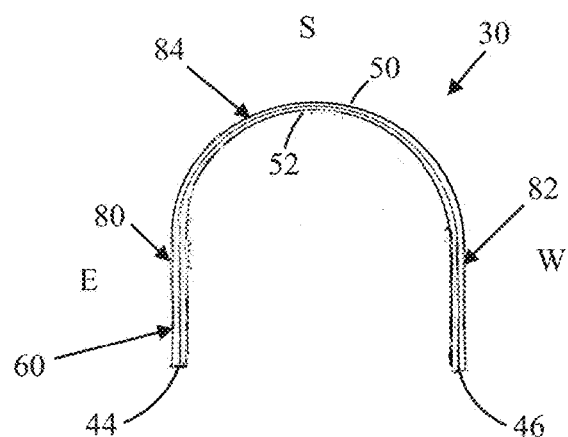
FIG. 3B is a top view of the solar collection device of FIG. 3A.

In some embodiments, the curved, vertical arrangement of the solar collection device 30 in the tower state of FIG. 3B (i.e., the D-shape or D-like shape) can be installed to collect the sun's power typical to the Leipzig study as described above. For example, the solar collection device 30 can be arranged such that the middle section of the curve 84 faces South while providing the side regions 80, 82 coming off the curved central region 84 to be flat and facing both the East and West. The advantage of the curve is also that the curved central region 84 collects the sun better by naturally matching the best and effectively moving angle as it changes without mechanical tracking costs and maintenance. It can be fixed. It also has more surface area because it is tall and extends low and high to better match the midday sun whether summer high or winter low sun angles. This is especially valuable in more northerly latitudes. The curved format of this embodiment provides a stronger form to resist folding and collapsing the solar tower from damaging winds. The tall, narrow with a curved single one-sided build between the East and West facing segments of the solar collection device 30 permits manufacturing PV on one side and to gather light for more of the day and more during the mid-day. It also creates a form that is stronger. Where desired by an end user, however, the solar collection device 30 can still be used in the flat arrangement of FIG. 2A; the lay flat option can be ideal for installation sites that are at or near the equator. Thus, the solar collection device 30 fits all locations.

In some optional embodiments of the curved solar collection device 30 in the tower state, one or more holes are formed or defined in the solar surface of the solar collection device 30 to permit high winds to travel through the surface. This reduces the amount of solar surface area and will impact the amount of power gain but one can just put up an additional tower or make the surface equivalent by making the curve wider or taller. This is unique in that no other solar system known uses holes in a single flexible solar format for this purpose. In yet other optional embodiments, the design can be made with two of these curved surfaces one in front of the other. This may create a stronger tower format. With these and related embodiments, the two-layer design can be made with off-set wind holes, or holes only being in the outer layer. Optionally, the inner layer is also photovoltaic and collects the sun's power missed by the outer layer holes. Optionally, the inner layer is the power storage or battery layer. Optionally, the inner layer is both the battery and the inner photovoltaic. Optionally, the two-layer design is separated by a honeycomb layer to create a sandwich. Optionally, the inner layer battery is not curved but has locations for providing support for the outer curved layer.

Figure 4:
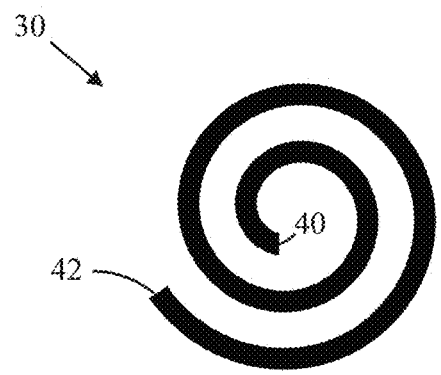
FIG. 4 is a simplified side view of the solar collection device of FIG. 2A in a storage state.

Returning to FIGS. 2A and 2B, in addition to promoting manipulation to a desired shape in a tower state, the solar collection device 30 is sufficiently flexible to be rolled onto itself in a direction of the length L to provide a storage state generally reflected in FIG. 4. A footprint of solar collection device 30 in the storage state is relatively small, greatly promoting low-cost storage and shipping as compared to conventional solar energy collection systems.

The D or D-like shape of the solar collection device 30 in the tower state of some embodiments of the present disclosure can be generated and maintained in various fashions. For example, one embodiment of a solar collection system 100 in accordance with principles of the present disclosure is shown in FIGS. 5A and 5B (FIG. 5A providing a side view of the system 100 in an installed or tower state to the ground 70, and FIG. 5B providing a top view). The system 100 is akin to other systems of the present disclosure and includes a solar collection device 110, an optional battery 112, and a support assembly or tower forming components 114. The solar collection device 110 can have any of the perovskite-based photovoltaic constructions described above, and can include perovskite nano-layer film photovoltaic formed on one or both sides of a plastic substrate. The solar collection device 110 can further include a flexible circuit substrate with circuitry appropriate for transmitting electrical power generated by the photovoltaic layer(s). The solar collection device 110 can optionally further include a power storage layer. In some embodiments, the solar collection device 110 is connected to the optional battery 112, operating to charge the battery 112 with collected power. The battery 112 is supported by the support assembly 114, and can optionally be a solid-state battery as described above. In some embodiments, the battery 112 is optionally removably secured to the support assembly 114.

The support assembly 114 can assume various forms. In some embodiments, the support assembly 114 is formatted to arrange and maintain the flexible solar collection device 110 along a curved shape, such as a C-shape, a C-like shape, a D-shape or D-like shape in the tower state (as been seen in the view of FIG. 5B). For example, the support assembly 114 can include one or more frame components 120 to which the solar collection device 110 is wrapped or secured. Each of the frame components 120 can include a cross member 122 supporting opposing retention bodies 124a, 124b. The retention bodies 124a, 124b are configured to receive and maintain a section of the solar collection device 110, imparting the curved shape to the solar collection device 110 as shown. An optional brace 126 can be provided with one or more of the frame components 120 to further support the curved arrangement of the solar collection device 110 upon final assembly. Moreover, the support assembly 114 includes components for supporting curved solar collection device 110 in the upright or vertical arrangement relative to the ground 70 as shown, for example via an upright 128 to which the frame component(s) 120 are connected, along with a ground anchor (e.g., an optional slab base 130, an optional auger-type body 132, etc.). In other embodiments, the solar collection system 100 can be configured for mounting to surfaces other than the ground 70, for example a roof; with these and related embodiments, the support assembly 114 can include components conducive to the end-use application that may or may not include the auger-type body 132. Regardless, in some embodiments, the solar collection system 100 can be conducive to a DIY user, for example by the solar collection device 110 being provided to the user in a compact format apart from the support assembly 114 (e.g., the solar collection device 110 can be transported and provided to the end user in a rolled format). With these and related embodiments, the support assembly 114 is configured to facilitate simple transitioning of the solar collection device 110 from the compact format to the curved shape reflected in the views as part of the installation process.

In some embodiments, the curved, vertical arrangement of the solar collection device 110 upon final assembly of the system 100 can be arranged to collect the sun's power typical to the Leipzig study as described above. For example, the solar collection device 110 can be arranged such that the middle section of the curve faces South while providing sides coming off the curve to be flat and facing both the East and West.

Another embodiment solar collection system 200 in accordance with principles of the present disclosure is shown in FIGS. 6A and 6B (FIG. 6A providing a side view of the system 200 in an installed or tower state to the ground 70 and FIG. 6B providing a top view of the tower state). The system 200 includes a solar collection device 210 and an optional battery 212 that can have any of the forms described above, along with a support assembly or tower forming components 214. The support assembly 214 is configured to arrange and maintain the solar collection device 210 to the curved shape (e.g., C-shape, C-like shape, D-shape, D-like shape, etc.) in the tower state as shown, for example via frame components 220, as well as to support the curved solar collection device 210 in the upright or vertical arrangement relative to the ground 70 (or other end-use installation surface).

Returning to FIG. 1, while some systems of the present disclosure provide the power or battery storage 32 physically apart from the solar collection device 30 (with wiring from the solar connection device 30 delivering collected energy to the battery storage 32), in other embodiments the battery storage 32 can be carried by the solar collection device 30 in a format that promotes desired arrangements in the tower and storage states. For example, one embodiment of a solar collection and storage assembly 300 useful with the systems of the present disclosure is shown in FIGS. 7A and 7B. In general terms, the assembly 300 provides solar power collection with on-board battery storage, and is transitionable from the flat arrangement of FIGS. 7A and 7B to a tower state having the D-shape described above (e.g., the D shape of FIG. 3B) and a shipping/storage state having a rolled format (e.g., the rolled format of FIG. 4).

The solar collection and storage assembly 300 includes a solar collection device 310 and a plurality of batteries 312. The solar collection device 310 can have any of the configurations described above with respect to the solar collection device 30 (FIGS. 2A and 2B), and is flexible. For example, the solar collection device 310 includes one or more perovskite layers (or solar cells) 320 formed on or carried by a flexible substrate 322. The perovskite-based solar collection device 320 further includes integrated circuitry components for conducting electrical power converted by the solar cells, for example by providing the substrate 322 as a flex circuit. The solar collection device 310 has the elongate shape (in the flat state of FIGS. 7A and 7B), defining opposing first and second sides 330, 332, and opposing first and second ends 334, 336.

Figure 8A:
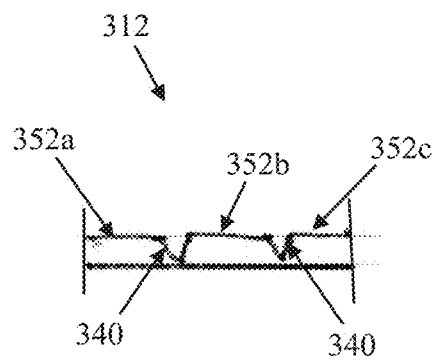
FIG. 8A is a simplified side view of a portion of a battery useful with the assembly of FIG. 7A and in a flat condition.
Figure 8B:
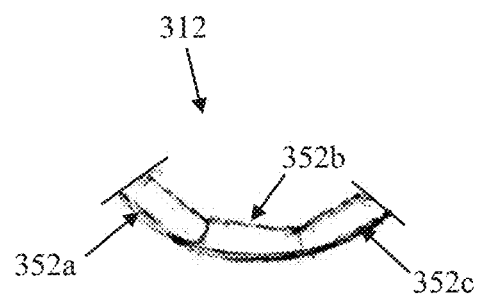
FIG. 8B illustrates transition of the battery portion of FIG. 8A to a curved condition.

The batteries 312 can have any construction appropriate for receiving and storing electrical power (e.g., solid state battery, lithium battery, etc.). Each of the batteries 312 is directly or indirectly attached to the substrate 322 (or back face) of the solar collection device 310, and in some embodiments, at least a portion of at least one of the batteries 312 is removably attached to the substrate 322. As shown, each of the batteries 312 has an elongated shape, and extends across the width of the solar collection device 310 (between the opposing sides 330, 332). Further, adjacent ones of the batteries 312 are spaced from one another in the length direction of the solar collection device 310. A spacing between successive batteries 312 is sufficient so that the assembly 300 can be rolled onto itself in a shipping/storage state (akin to the state of FIG. 4). Finally, each of the batteries 312 has a segmented-type construction. More particularly, notches 340 are formed into a thickness of each of the batteries 312, extending between opposing side edges 342, 344 thereof (labeled for one of the batteries 312 in FIG. 7A). The notches 340 are defined along at least a central section 350 of the battery 312, sized and located to permit or facilitate transitioning of the solar collection device 310 (and thus of the assembly 300 as a whole) from the flat state of FIGS. 7A and 7B to a curved tower state, for example akin to the D-shape of FIG. 3B. For example, FIG. 8A illustrates a portion of the central section 350 of one of the batteries 312 in the flat state. The notches 340 effectively divide the battery 312 into segments (three of which are labeled at 352a, 352b, 352c). Adjacent ones of the segments 352a, 352b, 352c can articulate or pivot relative to one another at the corresponding notch 340, permitting the battery 312 to transition or "fold" to the generally curved shape of FIG. 8B. Returning to FIGS. 7A and 7B, in some embodiments, the notches 340 are not formed in opposing side sections 360, 362 of each of the batteries 312; with this construction, the side sections 360, 362 will not readily fold or curve in the same manner as the central section 350 when the assembly 300 is subjected to forces intended to result in the D-shape of the tower state. Thus, the side sections 360, 362 of each of the batteries robustly support side regions of the solar collection device 310 in the D-shape (e.g., akin to the side regions 80, 82 of FIG. 3B). Thus, in some embodiments, the batteries 312 serve to assist in achieving and maintaining a desired shape of the solar collection device 310 (e.g., the D shape of FIG. 3B) in the tower state.

In other embodiments, the structural support described above can be provided by a body construction other than a battery. That is to say, one or more or all of the batteries 312 can be replaced by a non-battery body or structure having the segmented configuration described above. With these and related embodiments, one or more batteries apart from the solar collection device 310 can be provided with the system (e.g., with wiring from the solar collection device 310 delivering energy to the separate battery).

The solar collection and storage assembly 300 can incorporate various circuitry or circuitry components for delivering collected solar energy from the solar collection device 310 to the batteries 312. For example, conductors 370, 372 can be provided that electrically connect, directly or indirectly, the perovskite layers (or solar cells) 320 to positive and negative terminals, respectively, of each of the batteries 312. The conductors 370, 372 can be located near or at, and extend along, the opposing sides 330, 332. In some embodiments, the conductors 370, 372 can be circuitry traces provided with the flex circuit substrate 322. In other embodiments, the conductors 370, 372 can be wires, for example braided wires. With these and related configurations, the braided wire conductors 370, 372 (or similar structures) will provide physical and structural support and protection to the sides 330, 332 of the solar collection device 310. One or more or all of the batteries 312 can be directly electrically connected to the braided wire conductors 370, 372, or can be indirectly electrically connected; similarly, the perovskite layers 320 can be directly electrically connected to the braided wire conductors 370, 372 or can be indirectly electrically connected. In some embodiments, the conductors 370, 372 can continue or extend near or at the first end 334 and/or the second end 336 (or additional conductors can be provided at one or both of the ends 334, 336). In other embodiments, braided wires or similar structures can be provided intermittently, vertically at or near the batteries 312. For example, braided wires can be added to extend near or across the central section 350 of two or more of the batteries 312, near or across the one or both of the side sections 360, 362 of two or more of the batteries 312, etc. In some embodiments, a controller or control device 380 can be provided with or carried by the assembly 310, with conductors 370, 372 providing power to the controller 380. The controller 380 can take various forms, and in some embodiments is, or is akin to, a computer-like device including a processor programmed (or operating a software program) to perform various functions. The controller 380 can operate to control operation of the assembly 300 and/or track performance of the assembly 300 and/or the batteries 312, and can include wireless communication capabilities that facilitate user interface. Regardless, the conductor(s) or other supportive body optionally arranged near or at one or both the ends 334, 336 (e.g., a braided wire) provides additional physical and structural support and protection to the solar collection device 310.

With any of the electrical wiring or conduction formats described above, one or more or all of the batteries 312 can be permanently secured to the solar collection device 310. In other embodiments, one or more or all of the batteries 312 can be removably attached to the solar collection device 310 (including provision of electrical connection components that facilitate easy removal and re-attachment of the corresponding battery 312). With these and related embodiments, at least one battery 312 can be removed from the solar collection device 310 by a user for use in powering a separate device. In this regard, the segmented format of the batteries 312 can promote convenient transport and/or use of a removed battery (e.g., akin to a belt). In related embodiments, one or more or all of the batteries 312 can be configured such that only a portion thereof is removable from the solar collection device 310. For example, in some embodiments, the segmented central section 350 can be removable whereas the side sections 360, 362 are not.

The solar collection and storage assembly 300 can optionally include one or more features that facilitate arranging and maintaining the solar collection device 310 in the tower state (e.g., the D shape of FIG. 3B). For example, fasteners (e.g., grommets) 382 can be formed or provided along one or both of the ends 334, 336. The fasteners 382 can provide convenient structures or surfaces for securement to a separate holding device or body for final installation.

Figure 9:
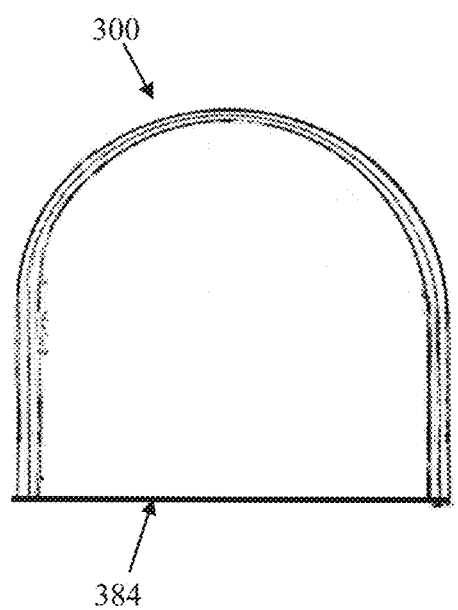
FIG. 9 is a simplified top view of the assembly of FIG. 7A held in a tower state by a retainer body.

DIY systems of the present disclosure that incorporate or include the solar collection and storage assembly 300 can include one or more tower formation components or other structures that readily facilitate DIY installation. In some embodiments, one or more retainers can be provided that are mounted to the solar collection and storage assembly 300 during installation that hold the solar collection device 310 to the desired shape (e.g., the D shape of FIG. 3B). For example, FIG. 9 illustrates a retainer 384 (e.g., a rigid plastic body) connected to the solar collection and storage assembly 300 that serves to dictate and maintain the D shape. Additional installation components or devices (e.g., mounting pole, mounting slab, screw flighted as an auger, etc.) of the present disclosure can also be employed.

Figure 10:
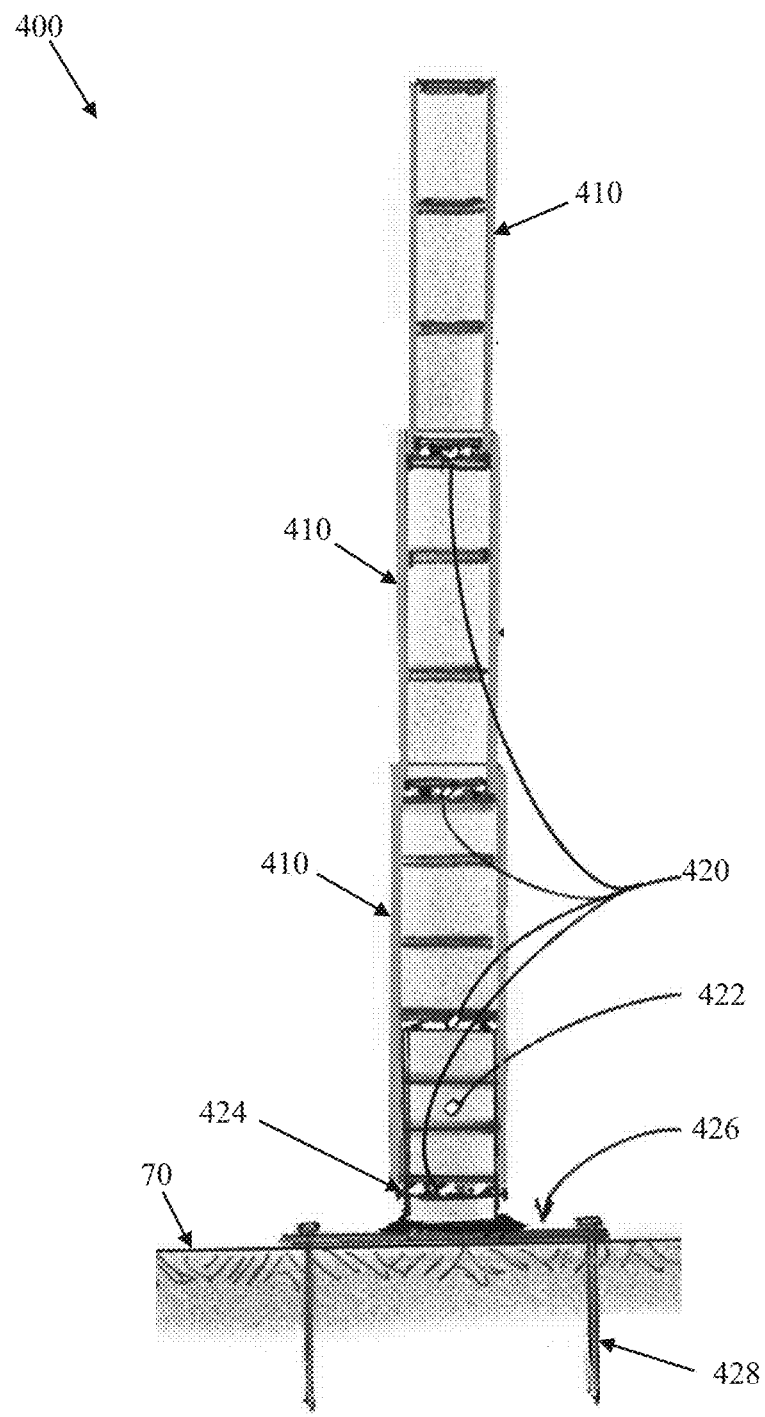
FIG. 10 is a side view of a solar energy collection and storage system in accordance with principles of the present disclosure upon final installation.

Another related embodiment system 400 incorporating the elongated, curved, vertically arranged solar device is shown in FIG. 10. With the system 400, two (or more) curved solar collection device segments 410, that otherwise can have any of the formats described above, can be vertically assembled to one another at the installation site (e.g., via a snap-together design or using fasteners 420 such as bolts) in forming a completed, elongated tower. This permits the segments 410 to be stacked for shipping. Optionally, the above tower segments are formed in reduced cross-section sizes for better nesting fit and so that when assembled provide a staggered tower where the next taller section is offset to permit a stronger overlapping portion to build a stronger tower. With these and other preformed shapes, the solar format may use a pole support inside the curve or directly behind or along the curve edges with one or two poles for additional support of the natural curve structural strength. One or more batteries 422 as described above can be provided with a base portion 424 of the system 400 and/or can be provided with or along each of the segments 410 (e.g., akin to the solar collection and storage assembly 300 (FIGS. 7A and 7B) described above). Finally, various structures or devices can be provided for securing the tower to the ground 70, such as a base plate 426 and spikes 428.

Returning to FIG. 1, while some of the systems of the present disclosure have been shown and described as manipulating the solar collection device 30 to a curved or D-like shape in the tower state, other shapes or arrangements can also be employed. For example, another example of a solar collection system 500 in accordance with principles of the present disclosure is shown in FIGS. 11A and 11B (FIG. 11A providing a side view of the system 500 installed in a tower state to the ground 70, and FIG. 11B providing a top view). The system 500 includes a solar collection device 510, an optional battery 512, and a support assembly or tower forming components 514. The solar collection device 510 can have any of the perovskite-based photovoltaic constructions described above, and can include perovskite nano-layer film photovoltaic formed on one or both sides of a plastic substrate (for example, opposing photovoltaic layers 520a, 520b labeled in FIG. 11B). The solar collection device 510 can further include a flexible circuit substrate with circuitry appropriate for transmitting electrical power generated by the photovoltaic layer(s). The solar collection device 510 can optionally further include a power storage layer. The solar collection device 510 can further include opposing edge strengthener strips 522, 524 that can optionally be configured as positive/negative conductors. In some embodiments, the solar collection device 510 is connected to the optional battery 512, operating to charge the battery 512 with collected power. The battery 512 is supported by the support assembly 514, and can optionally be a solid-state battery as described above. In some embodiments, the battery 512 is optionally removably secured to the support assembly 514. The support assembly 514 can assume various forms. In some embodiments, the support assembly 514 can include an upright 530, and opposing hanger brackets 532, 534. The hanger brackets 532, 534 are connected to opposing ends of the solar collection device 510, and to the upright 530. The upright 530 is connected to and/or provided with one or more features appropriate for securing the support assembly 514 to the ground 70 (or other end-use installation surface). For example, an auger anchor 540, a base plate assembly 542, and/or other devices can be provided. Regardless, with this configuration, the support assembly 514 maintains the solar collection device 510 in an upright or vertical arrangement relative to the ground 70 (e.g., the solar collection device 510 can have the elongated shape as shown (length substantially greater than a width and thickness), and in the installed state, the elongated length extends perpendicular to the ground 70). Additional supporting components can optionally be provided, such as an optional hang cable 550 connected to the upper hanger bracket 532 and extending between to auxiliary supports (not shown). The hang cable 550 can be connected to and/or provide additional solar power collection device(s). Alternatively or in addition, a base cable 552 can extend between the bottom hanger bracket 534 and the ground 70.

Figures 12A, 12B:
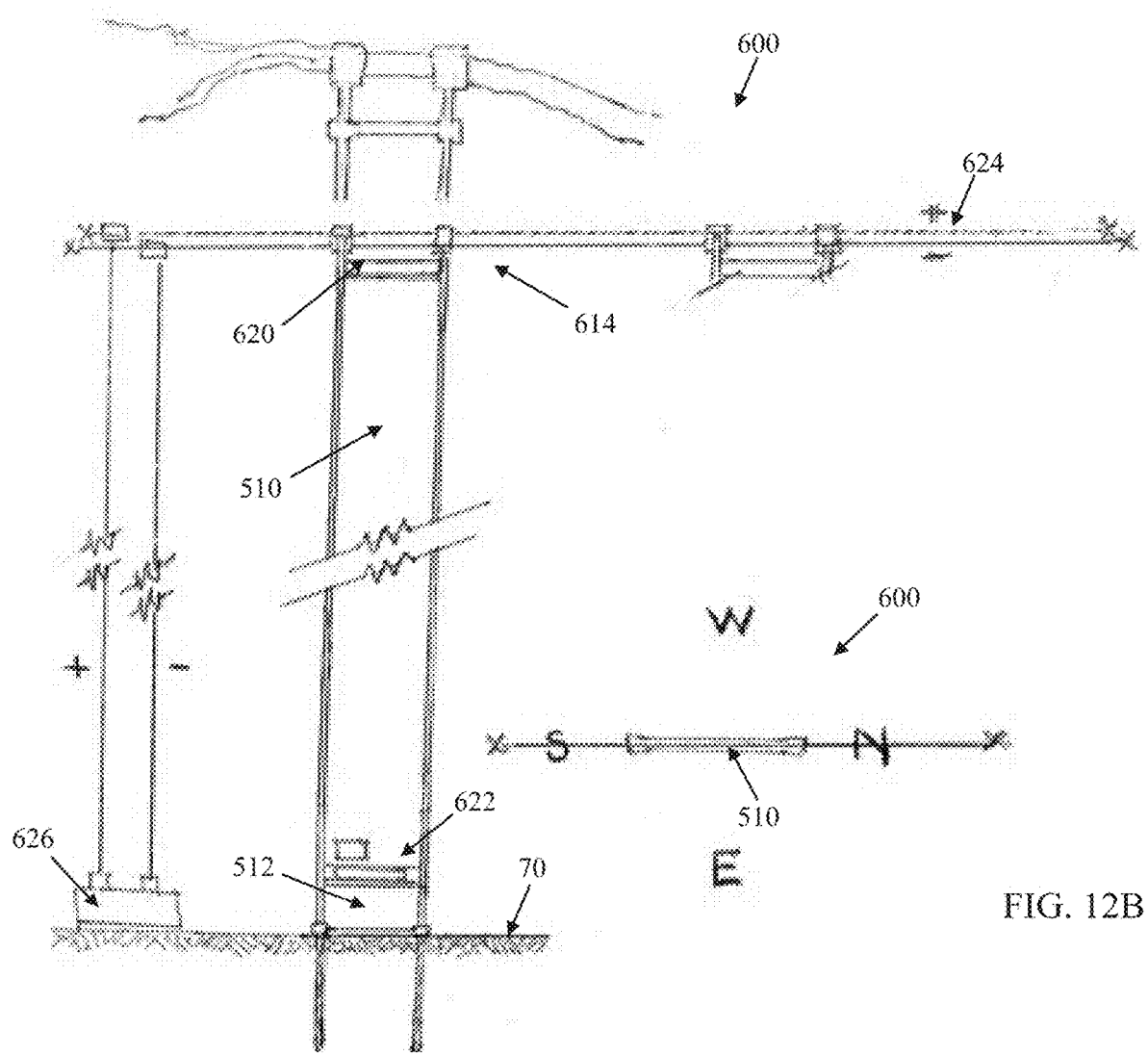
FIG. 12A is a side view of a solar energy collection and storage system in accordance with principles of the present disclosure upon final installation.
FIG. 12B is an enlarged top view of a portion of the system of FIG. 12A.

Another embodiment solar collection system 600 in accordance with principles of the present disclosure is shown in FIGS. 12A and 12B (FIG. 12A providing a side view of the system 600 installed in a tower state to the ground 70, and FIG. 12B providing a top view). The system 600 can be akin to the system 500 (FIG. 11A), and includes one or more of the solar collection devices 510 as described above, the optional battery 512, and a support assembly 614. The support assembly 614 can have various constructions appropriate for securing the solar collection device 510 to the ground 70 (or other end-use installation surface). For example, for each solar collection device 510, spreader bars 620, 622 can be attached to opposing ends of the solar collection device 510 to maintain the solar collection device 510 in a relatively flat or planar arrangement. The bottom spreader bar 620 can carry or be connected to a device, body or mechanism appropriate for securing to the ground 70 (e.g., posts). The upper spreader bar 622 can be slidably connected to an optional cross cable 624, opposing ends of which are supported relative to the ground 70. In some embodiments, the cross cable 624 can be electrically conductive, with power from the solar collection device 610 conducting to the upper spreader bar 622 and then to the cross cable 624. With these and related embodiments, the cross cable 624 delivers the so-conducted power to a battery 626. The upper spreader bar 622 can alternatively be supported relative to the ground 70 in a wide variety of other manners, for example, and as reflected in the insert to FIG. 12A, the upper spreader bar 622 can be secured to or over a tree branch, building structure, etc.

Figures 13A, 13B:
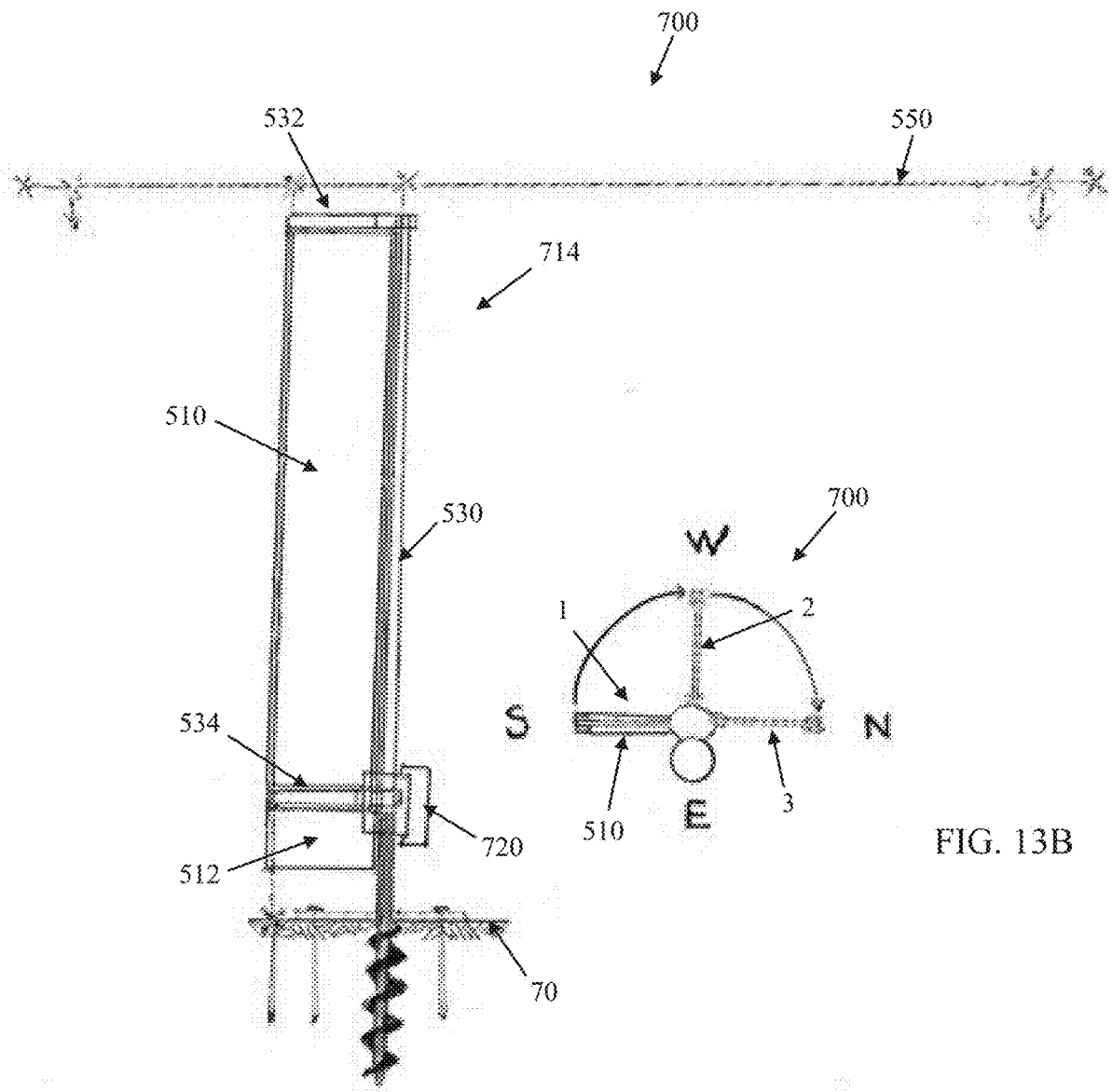
FIG. 13A is a side view of a solar energy collection and storage system in accordance with principles of the present disclosure upon final installation.
FIG. 13B is an enlarged top view of a portion of the system of FIG. 13A.

Another embodiment solar collection system 700 in accordance with principles of the present disclosure is shown in FIGS. 13A and 13B (FIG. 13A providing a side view of the system 700 installed in a tower state to the ground 70, and FIG. 13B providing a top view). The system 700 can be akin to the system 500 (FIG. 11A), and includes the solar collection device 510 and the optional battery 512 as described above, and a support assembly or tower forming components 714. The support assembly 714 can assume various forms. In some embodiment, the support assembly 714 can include the upright 530, and the opposing hanger brackets 532, 534. The hanger brackets 532, 534 are connected to opposing ends of the solar collection device 510, and to the upright 530. In some embodiments, the hanger brackets 532, 534 are rotatably secured to the upright 530, and an optional motor (e.g., index/track motor) 720 is connected to one or both of the hanger brackets 532, 534. With this configuration, the motor 720 can be operated to rotate the solar collection device 510 about the upright 530 (and thus relative to the ground 70). Operation of the motor 720 can be prompted in various manners (e.g., a programmable controller, a remote controller (e.g., smart phone app), wireless controls, etc.). Where the optional hang cable 550 is included, the upper hanger bracket 532 can be configured to permit rotation of the solar collection device 510 relative to the hang cable 550. Where rotation of the solar collection device 510 is desired, the optional base cable 552 can be omitted.

With the system 700 (as well as other solar collection systems of the present disclosure in which the corresponding solar collection device can be rotated), the vertically arranged solar device 510 beneficially includes a perovskite-based photovoltaic layer at, or exposed along, both major surfaces (i.e., the opposing photovoltaic layers 520a, 520b (FIG. 11B)). With these and related embodiments, the solar collection device 510 can be rotated to collect solar energy over the course of the day, with one or both of the layers or sides 520a, 520b being optimally exposed to expected sunlight. For example, the solar collection device 510 can be rotated to various positions (examples of which are labeled as "1", "2", and "3" in FIG. 13B) such that the solar collection device 510 readily collects solar energy in the early morning (position 1), mid-day (position 2), and late day (position 3) as described above (e.g., in accord with the Leipzig studies).

Figure 14:
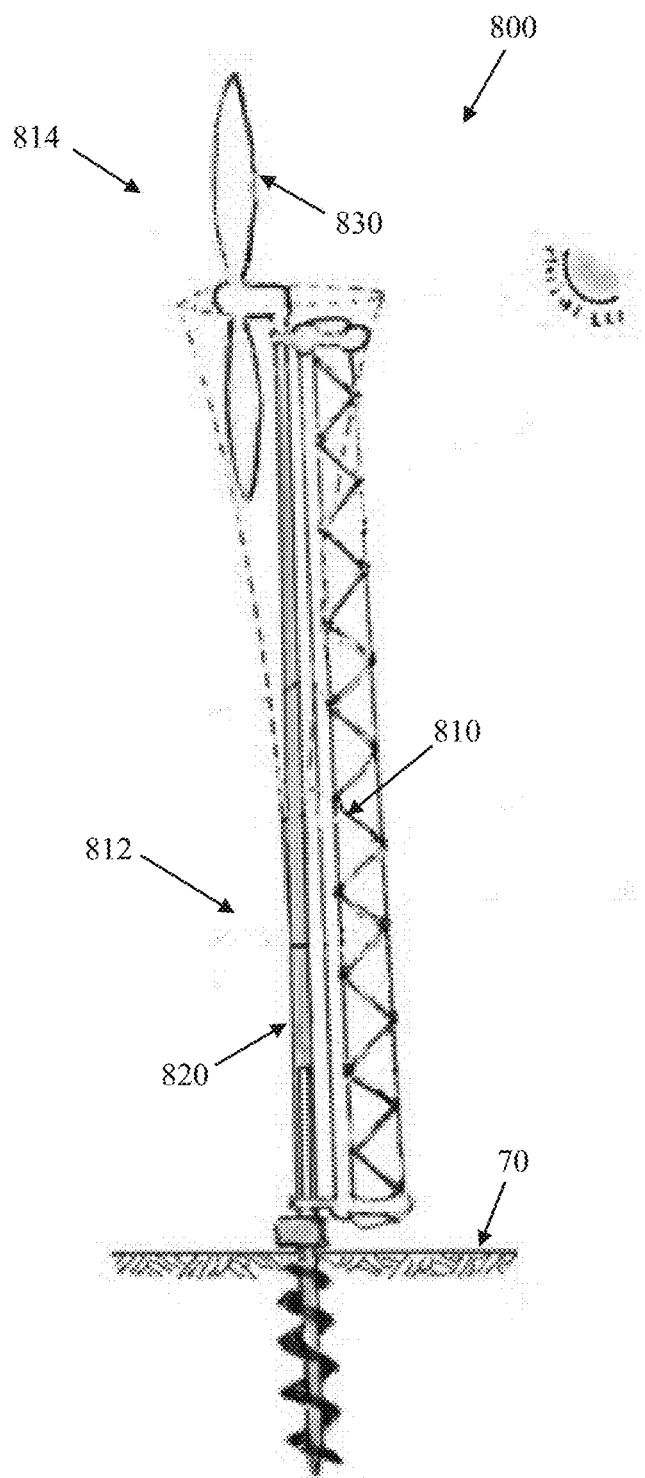
FIG. 14 is a side view of a solar energy collection and storage system in accordance with principles of the present disclosure upon final installation.

Another embodiment solar collection system 800 in accordance with principles of the present disclosure is shown in FIG. 14. The system 800 includes a solar collection device 810, a support assembly or tower forming components 812, and an optional wind power collection device 814. The solar collection device 810 can have any of the perovskite-based photovoltaic constructions described above, and can include perovskite nano-layer film photovoltaic formed on one or both sides of a plastic substrate. The solar collection device 810 can further include a flexible circuit substrate with circuitry appropriate for transmitting electrical power generated by the photovoltaic layer(s). The solar collection device 810 can optionally further include a power storage layer, such as a solid state battery layer. In some embodiments, the solar collection device 810 can be arranged to an accordion-like form (e.g., via the support assembly 812), several examples of which are described in Carroll, US Application Publication No. 2019/0273464, the entire teachings of which are incorporated herein by reference.

The support assembly 812 can assume various forms appropriate for supporting the solar collection device 810 relative to the ground 70 (or other end-use installation surface). For example, the support assembly 812 can include an upright 820 that forms or is connected to a ground anchor (e.g., the auger-type body shown).

The wind power collection device 814, where provided, can assume various forms appropriate for converting wind energy to electrical power, for example a propeller 830 that optionally operates (e.g., in response to wind-induced rotation) to power a motor 840. The motor 840, in turn, can be prompted or programmed to rotate one or both of the solar collection device 810 and the propeller 830 as appropriate for achieving a "best" gain for solar and/or wind energy. In some embodiments, the wind power collection device 814, including the propeller 830, can incorporate one or more of the features described in Carroll, U.S. Pat. No. 9,568,684, the entire teachings of which are incorporated herein by reference.

Figure 15:
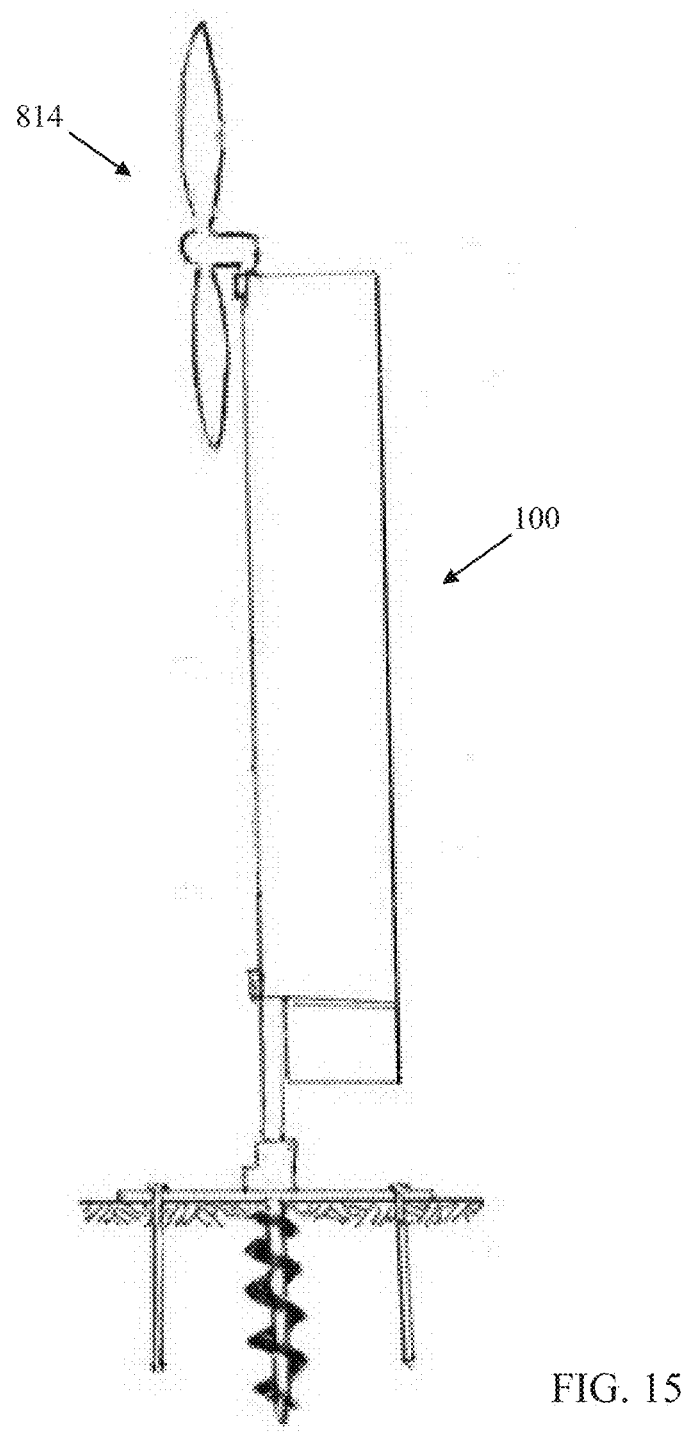
FIG. 15 is a side view of a solar energy collection and storage system in accordance with principles of the present disclosure upon final installation.

The wind power collection device 814 can be included with or incorporated into any of the solar collection systems of the present disclosure. For example, FIG. 15 reflects the wind power collection device 814 utilized with the solar collection system 100.

The solar collection system and methods of the present disclosure provide a marked improvement over previous designs. The systems of the present disclosure can be installed and used by do-it-yourself individuals. The solar collection devices utilized with the systems of the present disclosure can be made with continuous automated manufacturing methods, and can be made with lower cost substrate. With these and related embodiments, the solar collection device can be made so it is lighter and in smaller shapes for lower cost and easier transport, and can be made to incorporate strength when erected but rolled for shipping. Moreover, the solar collection devices of the present disclosure can be made in and shipped in various compact forms. The solar collection devices of the present disclosure can be made so the solar substrate is also conductive, and can be made so the solar substrate integrates electronic components for smart, protective and control features. The systems of the present disclosure can be made so the formed shape is sufficiently strong structurally as a stand-alone device, optionally with two or more solar collection device sections being vertically stacked to one another to form a staggered size vertical tower. In some optional embodiments, the solar collection devices of the present disclosure can be made so the wind has less surface area using holes. In some optional embodiments, the solar collection devices of the present disclosure can be made so a dual layer with holes to the outside improves durability in high wind conditions. In some optional embodiments, the solar collection devices of the present disclosure can be made so the edges have a component for a stronger film edge, a stronger self-structure yet rolls for shipping. In some embodiments, the systems of the present disclosure can be used as a single or multiple group of towers to meet power demands and property use and site limitations. The systems of the present disclosure can be made to withstand storms and/or to be manually or automatically repositioned for storms. In other embodiments, the systems of the present disclosure can be configured for temporary or intermittent use. The support assemblies of the present disclosure can be made with a variety of bases, poles or cable mountings. Alternatively or in addition, batteries can be mounted to the solar collection device and formatted to bind together in achieving a tower state. The battery storage can be removable in some embodiments, for example with mobile applications typical to a military person needing a power belt to power various devices or applications. Upon final installation, the systems and methods of the present disclosure can be made to gain more sun exposure for more of day without movement and/or to change shape to be larger in exposure towards the sun. When mass produced, costs of the solar collection systems of the present disclosure are likely less than silicon with glass typical to today's product.

Although the present disclosure has been described with reference to preferred embodiments, workers skilled in the art will recognize that changes can be made in form and detail without departing from the spirit and scope of the present disclosure.

What is claimed is:

1. A system for capturing and storing solar energy, the system comprising:
   a solar collection device including:
      a flexible substrate,
      a perovskite-based photovoltaic layer formed on the substrate such that the perovskite-based photovoltaic layer defines a front face of the solar collection device,
      wherein the solar collection device defines a first end opposite a second end, and a first side opposite a second side;
   at least one battery electrically connected to the perovskite-based photovoltaic layer; and
   at least one tower forming component;
   wherein the solar collection device is transitionable between a flat state, a storage state in which the solar collection device is rolled onto itself, and a tower state in which the solar collection device is maintained vertically upright and defines at least one curve between the first side and the second side by the at least one tower forming component, the perovskite-based photovoltaic layer extending continuously along the at least one curve.

2. The system of claim 1, wherein the system is configured to collect and store solar energy with the solar collection device in the flat state and in the tower state.

3. The system of claim 1, wherein the tower state includes the solar collection device, including the perovskite-based photovoltaic layer, arranged to a D-like shape.

4. The system of claim 3, wherein the D-like shape includes the solar collection device defining a curved central region, a first substantially flat side region, and a second substantially flat side region opposite the first substantially flat side region.

5. The system of claim 4, wherein the system is configured to be installed with the perovskite-based photovoltaic layer along the central region facing south, the perovskite-based photovoltaic layer along the first side region facing east, and the perovskite-based photovoltaic layer along the second side region facing west.

6. The system of claim 3, wherein the at least one tower forming component includes connector bodies extending between opposing edges of the solar collection device in the D-like shape.

7. The system of claim 3, wherein the at least one battery includes a plurality of batteries, each battery of the plurality of batteries being attached to a back face of the solar collection device.

8. The system of claim 7, wherein each battery of the plurality of batteries extends between the first side and the second side of the solar collection device.

9. The system of claim 8, wherein the plurality of batteries are spaced from one another in a length direction of the solar collection device to permit the solar collection device to be transitioned to the storage state.

10. The system of claim 8, wherein each of the batteries defines a segmented central region to permit the solar collection device to be transitioned to the D-like shape.

11. The system of claim 1, wherein the perovskite-based photovoltaic layer is electrically connected to the at least one battery by braided wires.

12. The system of claim 11, wherein the braided wires are arranged along at least two edges of the substrate to provide structural support in the tower state.

13. The system of claim 11, wherein the at least one battery is mounted to the substrate by attachment proximate to at least one of the braided wires.

14. The system of claim 1, wherein the solar collection device defines a plurality of openings configured to permit passage of wind.

15. The system of claim 1, wherein the at least one battery is removably connected to the solar collection device.

16. The system of claim 1, further comprising a plurality of the solar collection devices, wherein the system is configured to provide an installation state in which successive ones of the solar collection devices are vertically stacked.

17. The system of claim 1, further comprising a controller carried by the solar collection device and programmed to provide for wireless control over operation of the system.

18. The system of claim 1, further comprising at least one lighting device carried by the solar collection device.

19. The system of claim 1, further comprising at least one of a GPS device and an earth magnetic device.

20. The system of claim 19, wherein information generated by the at least one of the GPS device and the earth magnetic device is utilized to assist in orientation of the solar collection device in the tower state.

* * * * *